Feb. 13, 1923.
O. T. VAN SICKLE.
TOP AND WINDSHIELD FASTENER.
FILED MAY 9, 1922.
1,444,988.
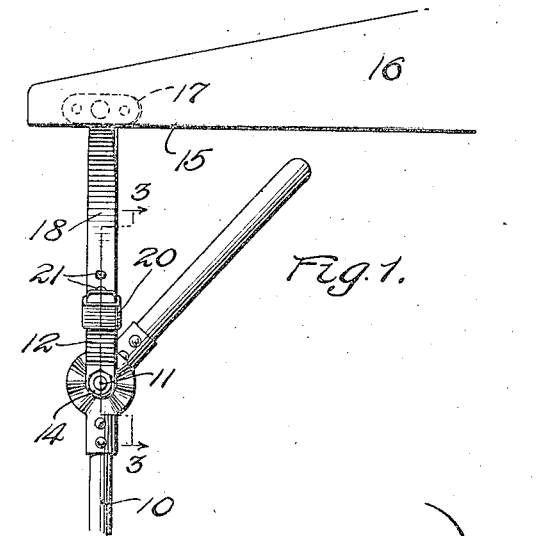
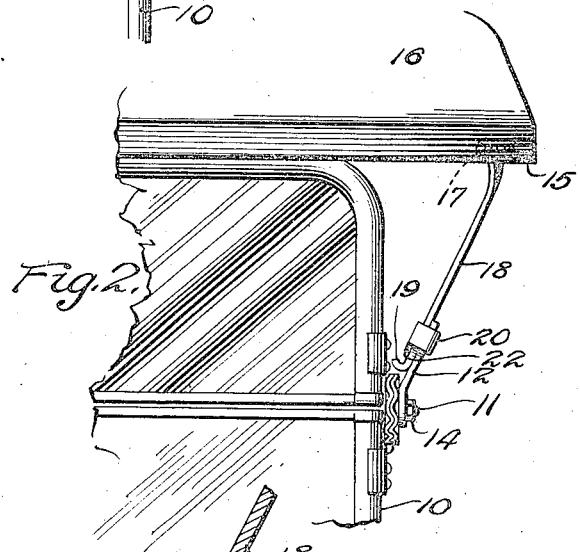
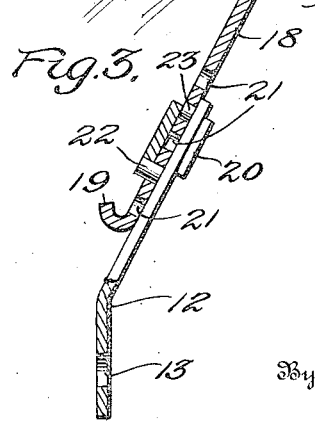
Inventor
Oscar T. Van Sickle
By
Attorney Patented Feb. 13, 1923.

1,444,988

UNITED STATES PATENT OFFICE.

OSCAR T. VAN SICKLE, OF GARDNERVILLE, NEVADA, ASSIGNOR OF ONE-HALF TO WILLIAM D. PARK, OF MINDEN, NEVADA.

TOP AND WINDSHIELD FASTENER.

Application filed May 9, 1922. Serial No. 559,524.

*To all whom it may concern:*

Be it known that I, OSCAR T. VAN SICKLE, a citizen of the United States, residing at Gardnerville, in the county of Douglas, State of Nevada, have invented certain new and useful Improvements in Top and Windshield Fasteners; and I do hereby declare the following to be a full, clear, and exact description of the invention, such as will enable others skilled in the art to which it appertains to make and use the same.

This invention relates to new and useful improvements in automobile devices, and particularly to devices for use in connection with the windshields and tops of Ford automobiles.

The principal object of the invention is to provide a device by means of which the windshield of a Ford automobile may be firmly secured to the top, to obviate the use of the straps.

Another object is to provide a device of this character which is readily separable to permit the top being raised and lowered.

A further object is to provide a device of this character wherein the top may be as tightly or as loosely connected with the windshield, as desired.

Other objects and advantages will be apparent from the following description when taken in connection with the accompanying drawing.

In the drawing:

Figure 1 is a side elevation of a portion of the top and windshield of an automobile, showing the invention in position thereon.

Figure 2 is a front elevation of the same.

Figure 3 is an enlarged vertical longitudinal sectional view on the line 3—3 of Figure 1.

Referring particularly to the accompanying drawing, 10 represents the frame of a windshield, of a Ford automobile, which has the stub shafts 11 to which is pivotally connected the upper movable portion of the shield. A metal strip 12 has its lower end bent at an obtuse angle, and is formed with an opening 13, which receives the said stub shaft 11, therethrough, the nut 14, being engaged on the shaft, outwardly of the said strip.

Secured to the front bow 15, of the top 16, is a metal plate 17, and pivotally connected to the center of this plate is the upper end of a longer metal strip 18. The lower end of the strip 18 is turned outwardly, as at 19, to serve as a stop for the sliding collar 20, which is disposed on the said strip. In the lower end portion of the strip 18 there are formed the longitudinal series of regularly spaced openings 21, for the reception of the longitudinally spaced studs 22 and 23, carried by the upper end of the shorter strip 12. The collar is arranged to embrace the upper end portion of the strip 12, as clearly seen in the drawing, and for this reason, the pin or stud 23 is shorter than the stud 22, this stud 23 being of a length sufficient to pass into one of the openings 21, so that its outer end will lie in the plane of the outer face of the strip 12. The collar thus slides down in embracing relation to the lapped ends of the strips 12 and 18, and covers the shorter stud 23, but abuts against the longer stud 22, so that the collar is limited in its downward movement. By disposing the pins or studs 22 and 23 in different pairs of openings 21, the connecting link between the windshield frame and the top bow can be shortened or lengthened, to suit the desires of the owner, and whereby the top can be secured as tightly or as loosely as needed.

With the present structure the windshield and top can be more firmly secured together than with the straps now in general use.

What is claimed is:

A top and windshield connector comprising a top carried member having a series of openings, a windshield carried member having a pair of studs one of which is adapted to enter one of the said openings and the other to extend through another opening, and a collar embracing the said members and arranged when engaged with one of the studs to cover the other stud.

In testimony whereof, I affix my signature, in the presence of two witnesses.

OSCAR T. VAN SICKLE.

Witnesses:
 HARRY A. WINKELMAN,
 EWALD F. WINKELMANN.